July 29, 1947.  T. H. BRIGGS ET AL  2,424,912
STEERING CONTROL MECHANISM
Filed April 30, 1945
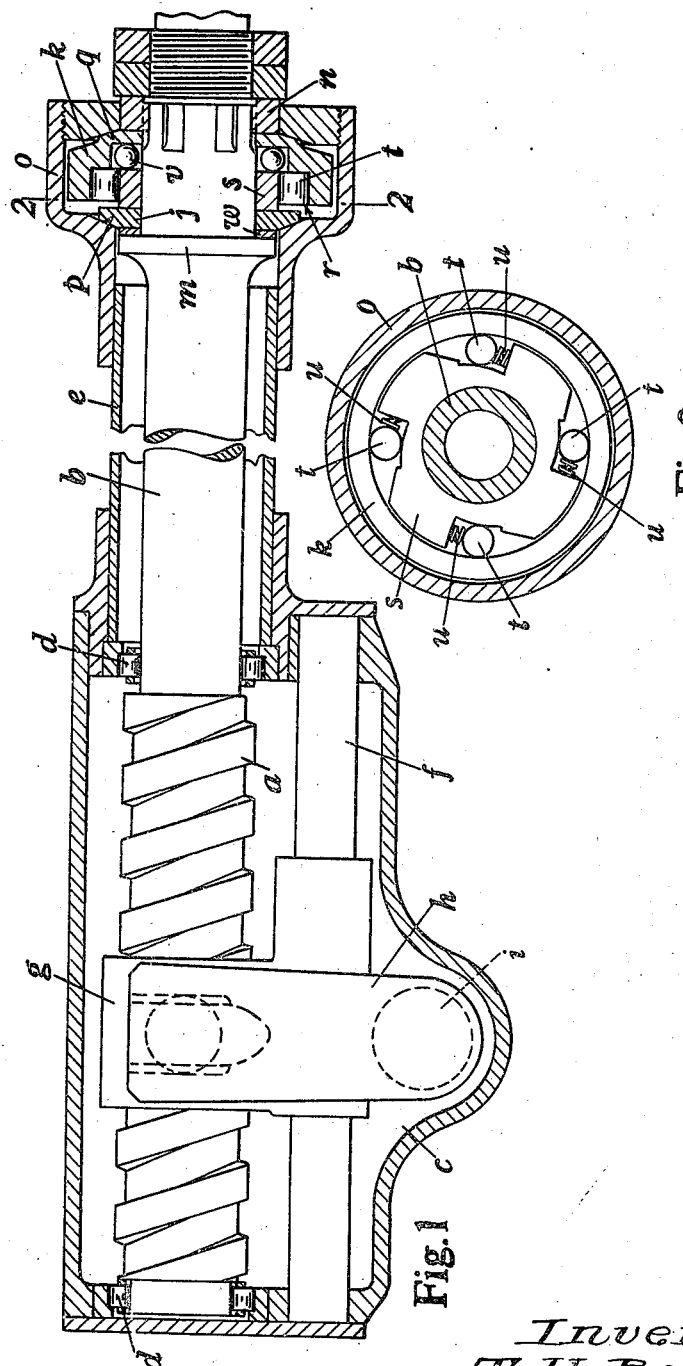
Inventors
T. H. Briggs
W. H. Briggs
By Harrock Downing & Co.
Attys.

Patented July 29, 1947

2,424,912

UNITED STATES PATENT OFFICE 2,424,912

STEERING CONTROL MECHANISM

Thomas Henry Briggs and Walter Henry Briggs, Birmingham, England, assignors to Burman & Sons Limited, Birmingham, England Application April 30, 1945, Serial No. 591,158
In Great Britain February 2, 1944

2 Claims. (Cl. 192—8)

This invention relates primarily to vehicle steering mechanisms of the kind by which movement is transmissible from a rotary member to the steerable road wheels through a screw and nut, worm, cam, toothed pinion and rack or other means. It is well known that when a vehicle is travelling over a rough surface, forces can be transmitted from the road wheels to the driver's hand wheel (or like part actuated by the driver) and sometimes these forces are sufficiently strong to impair the driver's control over the steering of the vehicle, especially when the steering mechanism is designed to provide a high mechanical efficiency, that is to say, when the mechanism is of the kind involving a minimum of frictional loss.

The object of the invention is to provide improved means for minimising reverse transmission of force through the mechanism without impairing the efficiency of the mechanism so far as the operator is concerned. In other words, the object of the invention is to provide improved means for enabling a mechanism to operate with high efficiency in one direction and with relatively low efficiency in the opposite direction.

Whilst the invention is primarily intended for use in vehicle steering, it may be applied to a variety of other uses, in which conditions analogous to that above described are met In the accompanying sheet of explanatory drawings:

Figure 1 is a sectional side elevation of a part of a vehicle steering mechanism embodying the invention, and Figure 2 is a cross section taken on the line 2—2 of Figure 1.

The vehicle steering mechanism shown in the drawings comprises a screw $a$ formed on or secured to one end of a rotary operating spindle $b$, a housing $c$ in which the screw is supported by bearings $d$ and from one end of which the spindle extends, a hollow column $e$ extending from the said end of the housing and containing the spindle, a guide bar $f$ secured within the housing and situated parallel with the screw, a nut $g$ slidably mounted on the guide bar and engaging the screw, and a lever $h$ engaging the nut and carried by a shaft $i$ having its axis at right angles to that of the screw. The end of the spindle $b$ remote from the screw $a$ is adapted for the attachment thereto of the steering hand wheel (not shown), and the shaft $i$ is adapted to be connected in any usual manner with the linkage associated with the steerable road wheels of the vehicle. Rotation of the screw $a$ in either direction causes a corresponding sliding movement of the nut $g$, and the latter serves to impart steering movements to the road wheels through the lever $h$ and the shaft $i$.

In carrying the invention into effect as shown, we mount freely on the rotary operating spindle $b$ a pair of friction rings $j$, $k$. The friction ring $j$ is supported by a fixed collar or shoulder $m$ formed on or secured to the spindle $b$, and the other friction ring $k$ is supported by a collar $n$ adjustably secured on the spindle. Secured to the outer end of the column $e$ is a housing $o$ which encloses the friction rings $j$, $k$, the interior of this housing being formed with a pair of mutually inclined annular friction surfaces $p$, $q$ with which complementary parts of the friction rings can cooperate. The friction ring $k$ is recessed at one side and adapted to form the outer annular member of a unidirectional friction clutch $r$, and the inner annular member of this clutch is formed by a ring $s$ abutting against or formed on the other friction ring $j$, the outer periphery of the inner member of the clutch being recessed to accommodate rollers $t$ which are urged by springs $u$ into contact with the plain peripheral inner surface of the outer member of the clutch. Also we provide between the members $k$, $s$ a number of bearing balls or rollers $v$ which form an anti-friction thrust bearing.

The mode of action is as follows:

When the spindle $b$ is rotated in one direction by the hand wheel, the reaction or end thrust exerted on the spindle by the nut $g$ causes the collar $m$ to press (through the medium of friction material $w$) against the friction ring $j$, and thereby relieve the pressure between this ring and the friction surface $p$ on the housing $o$. Also the friction ring $k$ is pressed against the friction surface $q$ on the housing $o$. The pressure exerted by the collar $m$ on the friction member $j$ causes the latter to rotate with the spindle $b$, and the pressure of this friction member on the clutch member $s$ causes the latter to rotate. Under this condition, however, the clutch $r$ is inoperative, and no resistance is offered to the rotation of the shaft by the hand wheel. When the hand wheel is rotated in the opposite direction, the end thrust on the spindle $b$ due to the reaction of the nut $g$, relieves the pressure between the collar $m$ and friction ring $j$ and between the friction surface $q$ and friction ring $k$, and increases the pressure between the friction ring $j$ and friction surface $p$ and between the collar $n$ and friction member $k$, causing the latter to be carried around by the spindle, but the clutch $r$ is again inoperative and no resistance is offered to rotation of the spindle. When, however, the nut $g$ tends to rotate the spindle $b$ in response to forces acting on the ground wheels, the endwise thrusts or reactions of the nut are reversed, and one or the other of the friction rings $j$, $k$ is frictionally held against rotation by the housing $o$, causing friction to be set up between the collar $m$ and ring $j$ or between the collar $n$ and ring $k$ (according to the direction of the thrust) and thereby resisting rotation of the spindle.

By this invention we are able to obtain the desired result in a very simple and convenient manner. The invention is not, however, limited to the example described as subordinate details of construction or arrangement may be modified to suit different requirements. Also the invention may be applied to other analogous uses, such as the actuating mechanism for the steering member of an aeroplane, or for the rudder of a boat.

Having thus described our invention what we claim as new and desire to secure by Letters Patent is:

1. A mechanism comprising the combination of a rotary operating member, movable friction members carried by the operating member, fixed complementary friction members between which the movable friction members are arranged, a single anti-friction thrust bearing arranged between the movable friction members, a single unidirectional clutch also arranged between the movable friction members, and means on the operating member for exerting pressure on the movable friction members.

2. A vehicle steering mechanism of the kind specified, having in combination a rotary operating spindle, a pair of rotatable friction members carried by the said spindle, fixed complementary friction members between which the rotatable friction members are arranged, a single anti-friction thrust bearing arranged between the rotatable friction members, a single unidirectional clutch also arranged between the rotatable friction members, and means on the spindle for exerting pressure on the rotatable friction members in response to axial pressure exerted by the spindle.

THOMAS HENRY BRIGGS.
WALTER HENRY BRIGGS.

REFERENCES CITED

The following references are of record in the file of this patent:

UNITED STATES PATENTS

| Number | Name | Date |
| --- | --- | --- |
| 2,240,932 | Kinser | May 6, 1941 |
| 2,344,797 | Briggs et al | Mar. 21, 1944 |